April 17, 1934.  J. H. W. SIEBERS  1,954,955
ELECTRICAL RECORDING DEVICE
Filed April 27, 1932   2 Sheets-Sheet 1

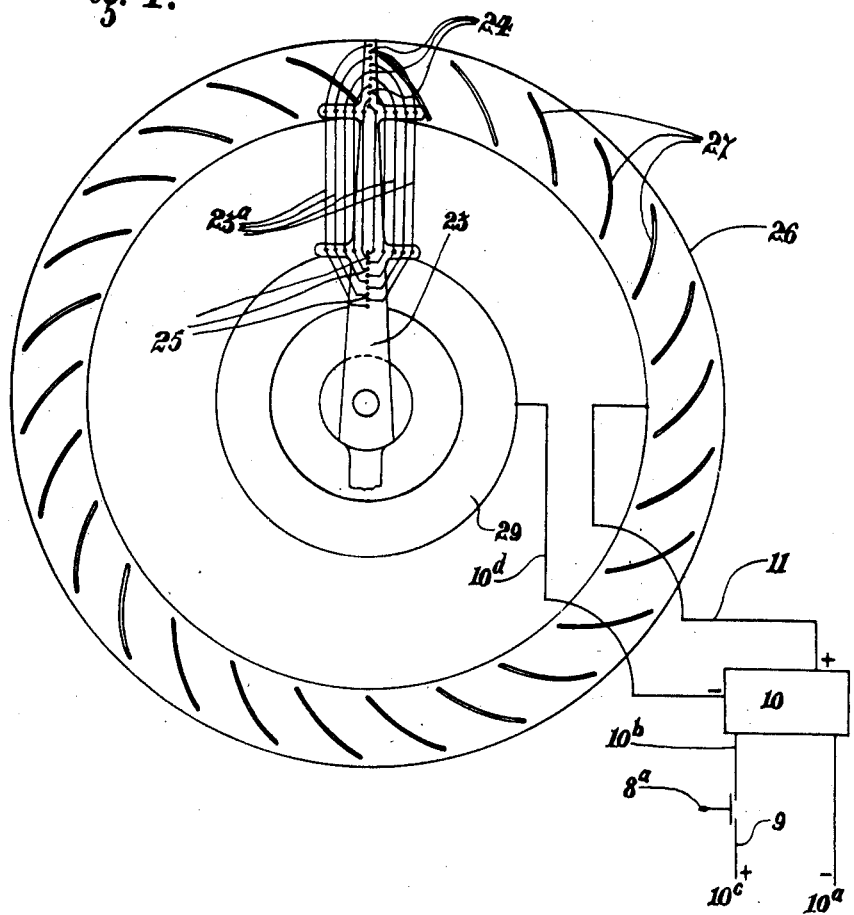

Patented Apr. 17, 1934

1,954,955

UNITED STATES PATENT OFFICE 1,954,955

ELECTRICAL RECORDING DEVICE

Johannes Hubertus Willibald Siebers, Voorburg, Netherlands

Application April 27, 1932, Serial No. 607,807
In Great Britain May 5, 1931

7 Claims. (Cl. 234—1.5)

This invention relates to electrical registering and recording devices and has particular reference to an electrical recording device for weighing apparatus, especially heavy capacity weighing scales.

The object of the present invention is to enable weighing and other apparatus to have electrical recording devices applied thereto such that the sensitiveness of the apparatus is not influenced in any way.

According to the invention an electric recording device is provided in which a primary pair of electrode means are relatively movable in planes located apart the length of a spark gap and a secondary pair of electrode means are also relatively movable in planes located apart the length of a spark gap, means being provided for producing a spark at the primary electrode means and a spark at the secondary electrode means so as to obtain on a paper or other chart or sheet a record of the magnitude of the relative movement of the electrode means and thus of the weighed load or other measured quantity.

In accordance with a further feature of the invention I also provide a chart for use in the electrical recording device, this chart having a very small hole burned by the electric spark and indicating with the aid of lines, figures or other signs the magnitude and/or value of the quantity being measured.

In the application of the electrical recording device to weighing apparatus, means is provided whereby the electrical recording device is located in the indicating housing of the weighing apparatus, e. g. at the back of this housing.

The invention, as applied to an electric recording device for a weighing scale, will now be described, by way of example, with reference to the annexed drawings, in which, Fig. 1 is a diagram of the electrical connections of the device;

Fig. 4 is a diagrammatic view of the electrical connections of a modification.

Figure 1:
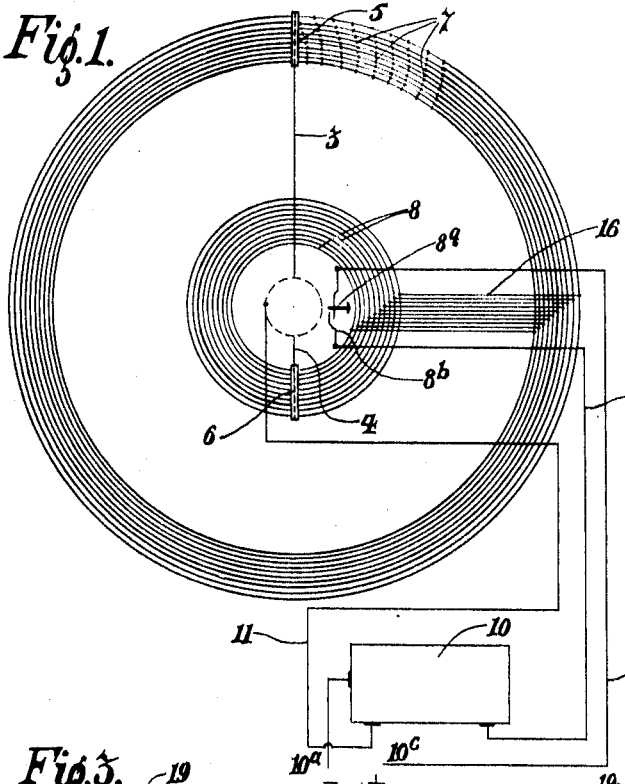

Referring to the drawings,

As in an ordinary weighing scale, a pointer 1 is adapted to co-operate with a reading chart 2, the mechanism for moving this pointer not being shown since it may be of any type known in the art.

On the axis of the pointer 1 a second pointer 3 of electrical conducting material is secured. To a piece of insulating material 3ª at the lower end of the conducting pointer 3, a conducting projection 4 is secured, and on the extremities of the pointer 3 and projection 4 electrodes 5 and 6 are respectively provided.

In a plane parallel to and slightly in front of the plane of movement of the conducting pointer 3, ten series of small fixed electrodes 7 are arranged in circular fashion. In the drawing, Fig. 1, the portion of the rings of electrodes 7 between what may be termed the "twelve and one o'clock" positions is illustrative of the entire annular area and is not to be taken as different from the remaining portions. The distance between the fixed electrodes 7 and the moving electrode 5 is made such that, while mechanical contact is entirely absent between these electrodes, a spark can be produced between the moving electrode 5 and any one of the fixed electrodes 7, exactly opposite which the moving electrode 5 comes to rest.

All the fixed electrodes 7 arranged in any one circle (see Fig. 1) are electrically connected together, and the ring of individual electrodes thus formed is electrically connected in turn to one of a series of the continuous rings 8. In front of the continuous rings 8 moves the electrode 6 of the projection 4, and as in the case of the moving electrode 5 and fixed electrodes 7, the distance between the rings 8 and the moving electrode 6 is such that, while no mechanical contact exists, an electric spark can pass between the moving electrode 6 and any one of the rings 8 as hereinafter specified.

For the supply of current to produce the sparks, when required, at the electrodes 5, 7 and 6, 8, an induction coil 10 is employed, the primary of this coil being connected to a negative terminal 10ª, and thence through a wire 10ᵇ, push button switch 8ª and a wire 9 with a positive terminal 10ᶜ. The secondary of the induction coil 10 is in circuit with a wire 11 which, at the end thereof remote from the coil 10, is connected to an electrode 12 (see Fig. 2). The secondary circuit of the coil is then completed through a spark gap 21 from the electrode 12 to the conducting pointer 3 and thence across the spark gap between the moving electrode 5 and one of the fixed electrodes 7 to the corresponding ring 8 through the corresponding connection 16, whereafter the circuit is completed across the spark gap between the said ring 8 to the electrode 6. The inner end 8ᶜ of the push botton switch 8ª is insulated from the outer part of the switch and, when depressed, projects through the hole 8ᵈ and is in spark contact with the projection 4 so that the circuit of the secondary of the induction coil 10 is completed from the electrode 6 through the inner end $8^c$ of the switch $8^a$ and contact $8^b$ to the negative end of the secondary by way of the wire $10^b$.

Figure 2:
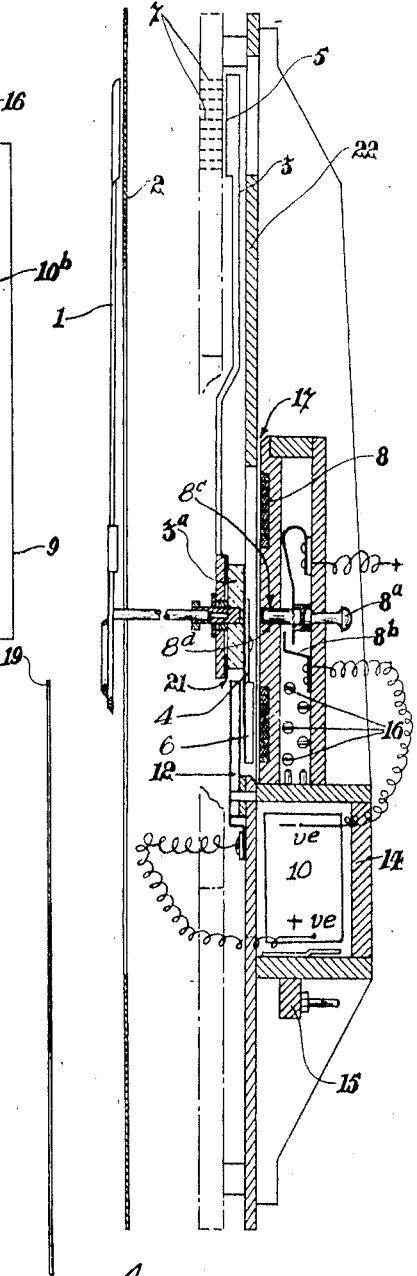
Fig. 2 is a view of the device and adjacent parts of the weighing scale in vertical section.

Preferably the terminals $10^a$, $10^c$ are connected to a current supply whose voltage is stepped down to about 8 volts. As shown in Fig. 2, the induction coil 10 can be located in a box-shaped chamber 14 and the connection of the primary of the coil to the negative terminal $10^a$ takes place by way of a contact member 15. The reference numeral 16 in Fig. 2 denotes the different connections of the first series of electrodes 7 with the rings 8.

Figure 3:
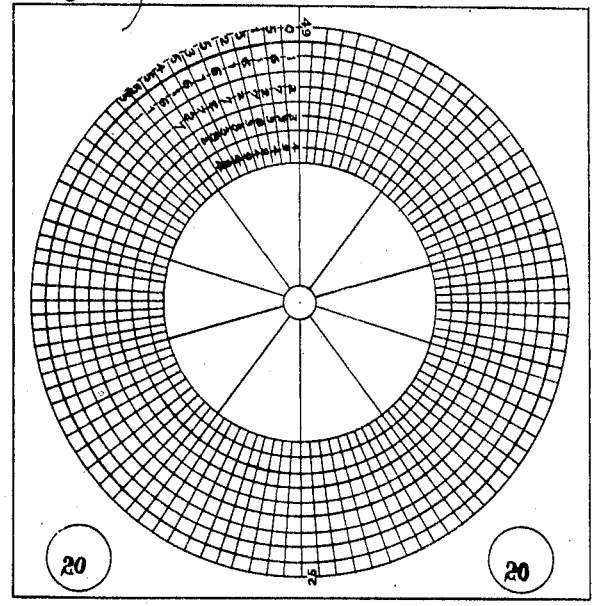
Fig. 3 is a face view of a paper weighing chart for use in the device.

A chart 19 for use in the device shown in Fig. 2 is illustrated in Fig. 3. This chart is adapted to be inserted into the space 17 (Fig. 2) between the rings 8 and the frame 22 so that at its lower part it lies between the rings 8 and the electrode 6 on the projection 4.

The marking on the chart consists, as shown in Fig. 3, of ten concentric circles crossed by a hundred outwardly radiating lines, every tenth of which is projected inwards to the centre of the chart. The intersections of each of the radiating lines with the concentric circles corresponds to a different weighing. Thus the whole chart is adapted to give any readings within a weighing capacity of 50 kilograms, every second radial line determining a single kilogram, and each division of the individual radial lines corresponding to one twentieth of a kilogram. It will be understood, of course, that any other weighing capacity can be provided for in chart form, the fixed electrodes 7, and rings 8 being constructed and arranged correspondingly.

On the chart 19, marks 20 (Fig. 3) are provided for the purpose of enabling the person using the weighing scale to insert the chart 19 in the correct position in the scale 17 in the recording device. By means of these marks and corresponding apertures or parts on the frame of the recording device, incorrect readings can be avoided. Alternatively, a punching device or other means may be provided on the recording device, the position of the punches or like means corresponding to the position of marked parts on the chart 19. These parts are adapted to register with the position of the punches or like means when the chart is in the correct position in the recording device, and, in this manner, when the punching device or like means is operated, the holes thereby produced in the said marked parts form a permanent record on the chart as to its being inserted in the device in the correct position.

The operation of the recording device is as follows:—

The chart 19 having been inserted in the space 17 and the moving parts of the weighing scale having come to rest, the switch $8^a$ is depressed and released. As a consequence a low tension current is made and broken in the primary of the induction coil 10, and a high tension current surge is thereby produced in the secondary of the induction coil. This high tension current surge produces a spark at the gap 21 and the current thereby flowing in the conducting pointer 3 produces a second spark between the electrode 5 and the particular individual electrode 7 opposite which the electrode 5 lies, the current circuit then being completed through the connection of this electrode 7 with the corresponding fixed ring 8, between which ring and the electrode 6 the high tension current surge produces a spark which burns a very small hole in the paper chart 19. In this manner the weight of the load on the weighing scale is registered on the chart 19.

A modification of my recording device is shown in Fig. 4. In this case, the indicating pointer 1, (Fig. 2) has movable therewith a second pointer 23, the longer arm of which carries at its end a number of electrodes 24 (say ten in all) insulated from each other, while the pointer 23 also carries a similar number of electrodes 25 insulated from one another but each connected by a wire $23^a$ to a corresponding electrode 24 at the end of the pointer 23.

In this modification, the concentric series of individual electrodes 7 (Fig. 1) is dispensed with and is replaced by a fixed ring 26 provided on its surface with inclined or angularly disposed ribs 27. The ring 26 and ribs 27 are of conducting material and are arranged concentric with a small ring 29. The ring 29 is of conducting material, but has no ribs on the surface thereof.

The pointer 23 and rings 26, 29 are so arranged that the electrodes 24 are located in a plane of movement situated the length of a spark gap away from the surface of the ribs 27, while the electrodes 25 are situated the length of a spark gap away from the plain surface of the small ring 29.

Between the rings 26 and 29 the secondary of an induction coil 10 is inserted by means of leads 11 and $10^d$. As in the first described construction (Fig. 1), the induction coil has primary positive and negative terminals $10^c$ and $10^a$ and is provided with a make-and-break key $8^a$.

The operation of this second construction is as follows:—

As in the first construction, a paper chart is adapted to be inserted between the plain ring 29 and the moving electrodes 25. The switch $8^a$ is depressed and released and the resulting high tension current surge in the secondary of the induction coil 10 produces a spark between one of the electrodes 24 and the part of the particular rib 27 over which the pointer 23 has come to rest. The current circuit is then completed through the corresponding wire $23^a$ whence a spark passes from the corresponding electrode 25 to the small ring 29, this latter spark burning a very small hole in the paper chart aforesaid.

The advantage of this construction as compared with that shown in Figs. 1 to 3 is that it is simpler in design and uses less wiring.

It is not necessary to indicate on the paper chart itself the concentric circles, radiating lines and weight numerals, but on the contrary the chart can be made blank and the weight registration read by utilizing a transparent glass or other standard chart or template upon which the said circles, lines and numerals are permanently marked. It is to be understood that a blank chart for use as stated with a glass standard chart or template is included in the term "recording chart" where used in the appended claims.

I claim:—

1. An electric recording device comprising a pointer, means whereby said pointer is rotatable, primary electrode means on said pointer, a series of fixed electrodes arranged in concentric circles in a plane spaced the length of a spark gap from the plane of movement of said primary electrode means, secondary electrode means on said pointer, means whereby said electrodes in each individual circle are electrically connected with a continuous ring arranged the length of a spark gap away from said secondary electrode means, and means for producing sparks at said primary and secondary electrode means so as to record the position of said pointer.

2. An electric recording device comprising a pointer, a series of primary electrodes carried by said pointer, means whereby said pointer is rotatable, fixed electrode means arranged concentrically with said pointer in a plane situated the length of a spark gap from the plane of movement of said primary electrodes, secondary electrodes on said pointer, means connecting each said primary electrode to a secondary electrode on said pointer, a fixed electrode ring arranged concentrically with said pointer in a plane separated from the plane of movement of said secondary electrodes by the length of a spark gap, and means whereby a spark can be produced at any one of said primary electrodes and the corresponding secondary electrode so as to obtain a record of the position of said pointer.

3. An electric recording device comprising a pointer, means whereby said pointer is rotatable, a series of rings of individual electrodes arranged concentrically with said pointer, means whereby the individual electrodes in each of said circles are interconnected with the other electrodes in the same circle, primary electrode means arranged on said pointer so as to be movable in a plane located the length of a spark gap from said fixed individual electrodes, secondary electrode means on said pointer, means whereby said secondary electrode means is insulated from said primary electrode means, a series of fixed concentric electrode rings over which said secondary electrode means is movable at a distance equal to the length of a spark gap, electrical connections whereby each said secondary electrode ring is connected to a corresponding circle of the individual electrodes co-operating with said primary electrode means, and means for producing sparks between said primary electrode means and one of said individual electrodes and between said secondary electrode means and the electrode ring corresponding to said individual electrode so as to record the position into which said pointer rotates.

4. An electric recording device comprising a pointer, a series of primary electrodes on said pointer, means whereby said electrodes are insulated from each other, a series of secondary electrodes on said pointer, means whereby said secondary electrodes are insulated from each other, means whereby each said primary electrode is connected to one of said secondary electrodes, means whereby said pointer with said primary and secondary electrodes is rotatable, a conducting ring arranged concentrically with said pointer substantially at the radius of said primary electrodes, angularly disposed conducting ribs provided on said ring so as to be located substantially the length of a spark gap from the plane of movement of said primary electrodes, a plain conducting ring arranged concentrically with said pointer so as to be located substantially at the radius of said secondary electrodes at the distance of a spark gap from the plane of movement thereof, and means for producing a spark between one of said ribs and the primary electrode nearest thereto and between the corresponding secondary electrode and said plain ring so as to record a position at which said pointer comes to rest.

5. An electric recording device comprising a recording pointer, primary electrode means movable with said recording pointer, means whereby said recording pointer is rotatable about a fixed axis, fixed electrode means arranged concentrically with the axis of said recording pointer so as to be located the length of a spark gap from the plane of movement of said primary electrode means, secondary electrode means arranged on said recording pointer at a smaller distance from the axis thereof than said primary electrode means, fixed electrode means arranged concentrically with said recording pointer so as to be located the length of a spark gap from the plane of movement of said secondary electrode means, a recording chart interposed between said secondary electrode means and the corresponding fixed electrode means, and means for producing sparks at said primary electrode means and thereby obtaining a record of the position of said indicating pointer on said recording chart to a reduced scale as compared with the size of said reading chart.

6. An electric recording device comprising a primary pair of electrode means, means whereby said electrode means are relatively movable in planes located apart the length of a spark gap, a secondary pair of electrode means, means whereby said secondary electrode means are so relatively movable that they reproduce the relative movement of the primary electrode means on a reduced scale in planes located on opposite sides of a recording chart and distant from each other the length of a spark gap, and means for producing a spark between said primary electrode means and a spark between said secondary electrode means so as to record on said chart to a reduced scale the relative position of said electrode means.

7. The combination of a reading chart, an indicating member adapted to co-operate with said reading chart, a recording chart having graduations corresponding to the graduations of said indicating chart within a smaller area, a recording pointer rotatable about a fixed axis, primary electrode means on said pointer, fixed electrode means arranged the length of a spark gap from the plane of movement of said primary electrode means, secondary electrode means arranged on said pointer at a smaller radius from the axis thereof than said primary electrode means, fixed electrode means arranged the length of a spark gap from said secondary electrode means and smaller in extent than said first fixed electrode means corresponding to the diminution in radial distance from the axis, means whereby said pointer is rotatable, and electric induction means for producing sparks at said primary electrode means and at said secondary electrode means so as to obtain a record on the reduced scale of the recording chart of the position to which said indicating member rotates, on said indicating chart.

JOHANNES HUBERTUS
WILLIBALD SIEBERS.